(12) United States Patent  (10) Patent No.: US 8,374,302 B2
Bode  (45) Date of Patent: Feb. 12, 2013

(54) DEVICE FOR AND A METHOD OF PROCESSING DATA SIGNALS

(75) Inventor: Peter Bode, Treuchtlingen (DE)

(73) Assignee: NXP B.V., Eindhoven (NL)

( * ) Notice: Subject to any disclaimer, the term of this patent is extended or adjusted under 35 U.S.C. 154(b) by 172 days.

(21) Appl. No.: 13/057,867

(22) PCT Filed: Aug. 5, 2009

(86) PCT No.: PCT/IB2009/053409
§ 371 (c)(1),
(2), (4) Date: Feb. 7, 2011

(87) PCT Pub. No.: WO2010/016017
PCT Pub. Date: Feb. 11, 2010

(65) Prior Publication Data
US 2011/0142172 A1  Jun. 16, 2011

(30) Foreign Application Priority Data
Aug. 6, 2008  (EP) ..................................... 08104975

(51) Int. Cl.
*H04B 1/10* (2006.01)
(52) U.S. Cl. ..................................................... 375/350
(58) Field of Classification Search ............. 375/350
See application file for complete search history.

(56) References Cited

U.S. PATENT DOCUMENTS

| 6,516,021 B1 * | 2/2003 | Abbott et al. ............... 375/150 |
| 2002/0039887 A1 * | 4/2002 | Delabbaye et al. ........... 455/42 |
| 2003/0058927 A1 * | 3/2003 | Douglas et al. .............. 375/147 |
| 2003/0072393 A1 | 4/2003 | Gu |
| 2003/0139167 A1 | 7/2003 | Ciccarelli et al. |
| 2004/0121738 A1 | 6/2004 | Ide |
| 2005/0070236 A1 | 3/2005 | Paulus |
| 2007/0291883 A1 | 12/2007 | Welz et al. |
| 2009/0016414 A1 * | 1/2009 | Lillo et al. .................. 375/150 |

FOREIGN PATENT DOCUMENTS
WO  02/43259 A2  5/2002
WO  03/052923 A2  6/2003

OTHER PUBLICATIONS

Heng, C-H., et al. "A CMOS TV Tuner/Demodulator IC With Digital Image Rejection", IEEE J. of Solid-State Circuits, vol. 40, No. 12, pp. 2525-2535 pages (Dec. 2005).
International Search Report and Written Opinion for Int'l. Patent Application PCT/IB2009/053409 (Dec. 16, 2009).

* cited by examiner

*Primary Examiner* — Erin File

(57) ABSTRACT

A method of data signal processing is provided, wherein the method comprises filtering a pre-filtered quadrature data signal by using an m×n filtering matrix, wherein m≠n. In particular, the filtering may be performed by using a rectangular matrix, i.e. a non-quadratic matrix. That is, the filtering may be performed by a matrix multiply in an image cancellation filtering unit. In general m relates to the 5 number of rows of the matrix while n relates to the number of columns of the matrix. In particular, the processing may form or may be a part of an image cancellation process.

10 Claims, 3 Drawing Sheets

DEVICE FOR AND A METHOD OF PROCESSING DATA SIGNALS

FIELD OF THE INVENTION

The invention relates to a device for processing data signals, in particular for performing image cancellation of the data signals.

The invention further relates to a method of processing data signals, in particular to an image cancellation method.

Moreover, the invention relates to a program element. Further, the invention relates to a computer-readable medium.

BACKGROUND OF THE INVENTION

There is a trend in hand-held devices for mobile communications towards Systems on Chip (SoCs), meaning that the digital baseband (BB) sub system and the RF sub system are integrated on a single chip in CMOS technology. Traditionally, these two subsystems were implemented on dedicated chips in CMOS and BiCMOS technology, respectively. SoCs promise cost reduction, provided the high yield known from purely digital chips is reached:

The RF subsystem is characterized by several figures of merit, such as image rejection or noise figure. If one of the figures of merits of a given chip is outside the specified range, then this chip is bad and reduces the yield. Since the yield in analogue chips is usually lower than in digital chips, measures for yield improvement are required. This leads to heavy use of calibration techniques and digital signal processing.

Receivers in today's cellular phones employ a single analogue conversion stage from RF to baseband. The receivers distinguish in the choice of the Intermediate Frequency (IF) of the analogue baseband signal before digitization. For example, Low IF in 2G and 2.5G cellular applications may be used. However, after RF BiCMOS technology progressed and certain problems disappeared that Low IF avoided, Zero IF is an option as well. With the switch to CMOS technology, these problems recurred and/or new problems came up, with the consequence that some manufacturers have changed from Zero IF to Low IF in their 2.5G cellular products.

However, there may be a need to provide a data signal processing device and method that can improve raw image rejection in a Low IF receiver, in particular by using digital processing.

SUMMARY OF THE INVENTION

It is an object of the invention to provide a data signal processing device and a data signal processing method which can be used to improve raw image rejection in a Low IF receiver, in particular by using digital processing.

In order to achieve the object defined above, a device for processing data signals, a method of processing data signals, a program element, and a computer-readable medium according to the independent claims are provided. Preferred embodiments are described in the dependent claims.

According to an exemplary embodiment a method of data signal processing is provided, wherein the method comprises filtering a pre-filtered quadrature data signal by using an m×n filtering matrix, wherein m≠n. In particular, the filtering may be performed by using a rectangular matrix, i.e. a non-quadratic matrix. That is, the filtering may be performed by a matrix multiply in an image cancellation filtering unit. The filtering of the data signal or pre-filtered data signal by the matrix multiply may also be called a transforming of the data signal. In general m relates to the number of rows of the matrix while n relates to the number of columns of the matrix. In particular, the processing may form or may be a part of an image cancellation process.

According to an exemplary embodiment a device for data signal processing is provided, which comprises an image cancellation filtering unit having inputs adapted to receive a pre-filtered data signal, wherein the image cancellation filtering unit is adapted to filter the received pre-filtered quadrature data signal by using an m×n filtering matrix, wherein m≠n.

According to an exemplary embodiment a program element is provided, which, when being executed by a processor, is adapted to control or carry out a method according to an exemplary aspect of the invention.

According to an exemplary embodiment a computer-readable medium is provided, in which a computer program is stored which, when being executed by a processor, is adapted to control or carry out a method according to an exemplary aspect of the invention.

The data signal processing according to embodiments of the invention can be realized by a computer program, that is, by software, or by using one or more special electronic optimization circuits, that is in hardware, or in hybrid form, that is by means of software components and hardware components.

By using a rectangular filtering matrix it may be possible to provide an efficient image rejection in a Low IF receiver, in particular by using digital processing. That is, it may be possible to efficiently cancel images generated in case of asymmetries in the analogue part of the filtering device, which images are hard to correct in the digital domain when using a conventional digital filtering system.

Thus, a gist of an exemplary aspect of the invention may be seen in the fact that for the processing or filtering of data signals a matrix multiply may be used for image cancellation wherein the matrix is a rectangular matrix. Preferably, the image cancellation is performed after a pre-filtering of the data signal. In general the goal of image cancellation is the removal of the unwanted signal while leaving the wanted signal unchanged except a potential phase shift or amplitude change.

Next, further exemplary embodiments of the invention will be described.

In the following, further exemplary embodiments of the method of processing data signals will be explained. However, these embodiments also apply for the device for processing data signals, for the program element and for the computer-readable medium.

According to another exemplary embodiment the method further comprises pre-filtering a quadrature data signal to generate the pre-filtered quadrature signal by using a decimation filter. In particular, the decimation filter may be combined with an image cancellation filtering unit, performing the filtering by matrix multiply, in one stage or one unit. For example, the decimation filter may be a complex valued decimation filter as they are encountered in Low IF receivers.

That is, before the data signal is filtered by using a rectangular matrix a pre-filtering may be performed suitable to increase the resolution of the data signal while decreasing the oversampling factor. For example, such a decimation filter may convert a 2×1 bit signal at 26 MHz (corresponding to an oversampling factor of 96) to a 2×16 bit signal at 542 kHz (corresponding to an oversampling factor of 2). In particular, the decimation filter may be formed by a single stage decimation filter or by a double stage decimation filter. For example single stage decimation filters (DF) may be employed in so called GSM Base Band Interface (BBI) chips. Double stage DF may comprise as a first stage a Cascaded Integrator Comb (CIC) filter, while the second stage may be a standard FIR decimation filter. Alternatively, the first stage may be a decimating FIR filter. By placing the matrix multiply after the decimation filtering (DF), regardless of the number of filter stages, it may be possible to perform the matrix multiply at minimum clock rate and possibly preserve efficient DF designs for low resolution input signals.

The term "decimation filter" may particularly denote a filter which may be used to turn a low resolution, highly oversampled input signal into a high resolution output signal having a low oversampling factor. Such a decimation filter may be a suitable measure to reject quantisation noise and/or rejection of signals of adjacent channels.

According to another exemplary embodiment of the method the decimation filter is a decimating FIR filter.

According to another exemplary embodiment the method further comprises performing a low pass filtering of the quadrature data signal by a low pass filter before performing the decimation filtering. In particular, the low pass filter may comprise a low pass sigma delta modulator. For example, the low pass filter may comprise several filters, e.g. may comprise a common low pass filter and a low pass sigma delta modulator.

According to another exemplary embodiment of the method the relation n≧m is valid. That is, the matrix may be a matrix wherein the number of columns is twice the number of rows or vice versa.

According to another exemplary embodiment of the method the filtering matrix is a 2×4 matrix. In particular, the filtering matrix may feature values equal 1 or 0 respectively. For example, the filtering matrix may be of the form of:

$$M = \begin{bmatrix} 1 & -k_{21} & -k_{22} & 0 \\ k_{21} & 1 & 0 & k_{22} \end{bmatrix}$$

For example, $k_{21}$ is given by $-2\epsilon \leq k_{21} \leq 2\epsilon$ and $k_{22}$ is given by $1-2\epsilon \leq k_{22} \leq 1+2\epsilon$. In particular, $\epsilon$ may be given by $\epsilon = 10^{-r_{raw}/20dB}$, wherein $r_{raw}$ may correspond to a raw image rejection measured in dB. In that case the worst case raw image rejection may correspond to an $\epsilon$ of 0.1. It should be noted that other values of raw image rejections than the stated 20 dB are possible. In that case the value of $\epsilon$ is changed accordingly.

An exemplary aspect of the invention may be seen in providing a method of image cancellation including the multiplying of a digital data signal by a matrix in the digital domain, wherein the matrix multiplying is performed after a pre-filtering, e.g. a decimation filtering, and using a rectangular matrix, e.g. a 2×4 matrix. The digital data signal may be a quadrature signal. The using of a rectangular matrix may particularly ensure that known advantages of a Zero IF solution may also be achievable in a Low IF case. In particular, the filtering or image cancellation may be merged with decimation filtering in sigma delta type ADCs, which may result in a very efficient implementation that preserves the advantages of decimation filters for low resolution input. The provided method may not be restricted to certain wireless communication standards but may be generic. By implementing the matrix multiplying, which builds an image cancellation (IC) block, after the decimation filter it may be possible to reuse efficient decimation filter designs for 1 bit input instead of developing a complicate redesign of the DF. Furthermore, the usage of a method according to an exemplary embodiment may omit the necessary to perform the IC filtering or function at high sampling rate.

The exemplary embodiments and aspects defined above and further aspects of the invention are apparent from the examples of embodiment to be described hereinafter and are explained with reference to these examples of embodiment. It should be noted that features described in connection with one exemplary aspect or embodiment may also be combined with the features of another exemplary aspect or embodiment.

BRIEF DESCRIPTION OF THE DRAWINGS

The invention will be described in more detail hereinafter with reference to examples of embodiment but to which the invention is not limited.

DETAILED DESCRIPTION OF THE EMBODIMENTS

Figure 1:
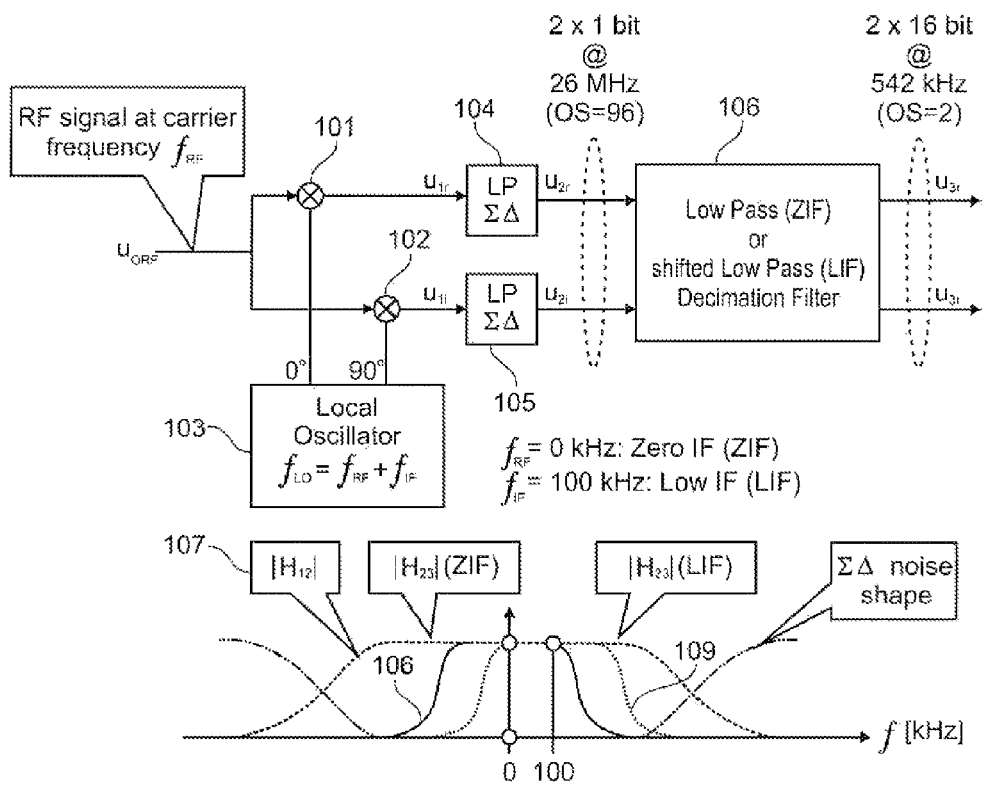
FIG. 1 schematically shows signal flow in a receiver.

The illustration in the drawing is schematically. In different drawings, similar or identical elements are provided with the same reference signs.

In the following, referring to FIGS. 1 to 7 some basic principles of data processing in a device according to exemplary embodiments will be explained.

FIG. 1 showing a perfect receive chain without asymmetries as a starting point and serves for explaining some principles of image cancellations in a receiver and shows a schematic outlining the signal flow in a receiver converting an RF signal $u_{0RF}$ to baseband Input/Output (I&O) signals $u_{1r}$ and $u_{1i}$ in a single analogue conversion stage by using two mixers 101 and 102 and two local oscillators (LO) signals provided by an LO 103. It is common practice to regard the I&O signals as real part and imaginary part of a complex valued signal, hence the indices r and i are chosen. The corresponding complex signal valued signal is defined by $u_1 \equiv u_{1r} + ju_{1i}$ and is at a Low Intermediate Frequency (IF) of 100 kHz or at Zero IF, depending on the choice of the LO frequency.

The signal components $u_{1r}$ and $u_{1i}$ are fed into Low Pass (LP) Sigma Delta Modulators (SDMs) 104 and 105 converting the analogue signals into two bit stream signals $u_{2r}$ and $u_{2i}$. The identical SDMs have a LP frequency response $|H_{12}|$ 107 that is sketched in FIG. 1 at the bottom. The quantisation noise has the well known highpass shape. The SDMs may be preceded by analogue LP filters which are not shown because they do not affect the important fact that the over all frequency response of the analogue baseband path has LP characteristic.

The decimation filter (DF) 106 turns the low resolution, highly oversampled input signal into a high resolution output signal with low oversampling factor. Two primary tasks are fulfilled, namely:
rejection of quantisation noise,
rejection of adjacent channel signals.

The latter task demands for a dependency of the DF's frequency $|H_{23}|$ response on the chosen intermediate frequency. The lower part of FIG. 1 illustrates |$H_{23}$| for both Zero IF 108 mode and Low IF 109 mode assuming complex valued signals.

Figure 2:
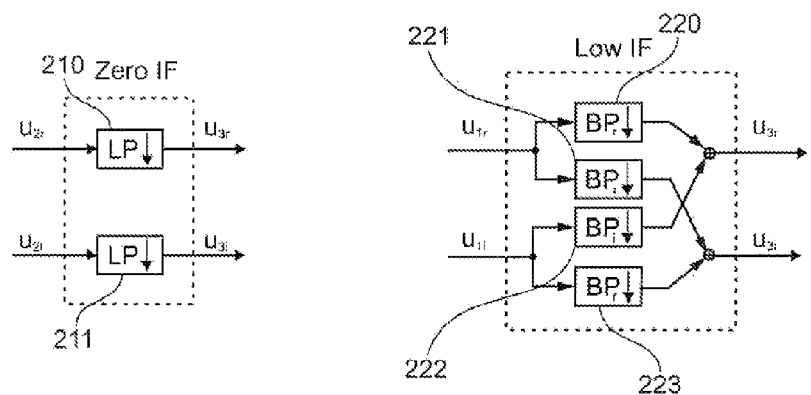
FIG. 2 schematically shows topologies of decimation filters in Zero IF and Low IF mode.

The topology of the DF block shown in FIG. 1 depends on the chosen IF as outlined in FIG. 2.

In case of Zero IF, shown in the left part of FIG. 2, simply two identical instances of a Low Pass (LP) DF 210 and 211 may be used. Usually, the DFs are FIR type. In case of Low IF, shown in the right part of FIG. 2, four Band Pass (BP) DFs 220, 221, 222, and 223 are used: Two identical instances $BP_r$ 220 and 223 and two identical instances $BP_i$ 221 and 222 may be used. Again, the DFs are usually FIR type. The impulse responses of $BP_r$ and $BP_i$ follow from the impulse response of LP by multiplication with a cosine and a sine at the intermediate frequency, respectively. In terms of complex valued signals, this design rule leads to a frequency shifted version of the low pass characteristic for Zero IF mode. However, other design rules for $BP_r$ and $BP_i$ are possible as well, leading to frequency responses for complex signals that show no symmetry at all.

Unwanted image reception in quadrature down converters may particularly occur due to gain mismatch between RF, LO and BB paths of the mixers and due to phase error between the two LO signals. These asymmetries may be summarized in an equivalent baseband model for vector signals:

$$\begin{bmatrix} u_{1r} \\ u_{1i} \end{bmatrix} = G \cdot \begin{bmatrix} u_{0r} \\ u_{0i} \end{bmatrix} = \begin{bmatrix} g_{11} & g_{12} \\ g_{21} & g_{22} \end{bmatrix} \cdot \begin{bmatrix} u_{0r} \\ u_{0i} \end{bmatrix} \quad (1)$$

Here, $[u_{0r}, u_{0i}]^T$ represents the nominal I&Q signal for perfect symmetry and $[u_{1r}, u_{1i}]^T$ represents the actual I&Q signal in the presence of asymmetries. The 2-by-2 matrix G has constant elements and equals the unity matrix with $g_{11}=g_{22}=1$ and $g_{12}=g_{21}=0$ in case of perfect symmetry. Asymmetries in a real receiver lead to a moderate deviation from the unity matrix with $g_{11} \approx g_{22} \approx 1$ and $g_{12} \approx g_{21} \approx 0$.

Figure 3:
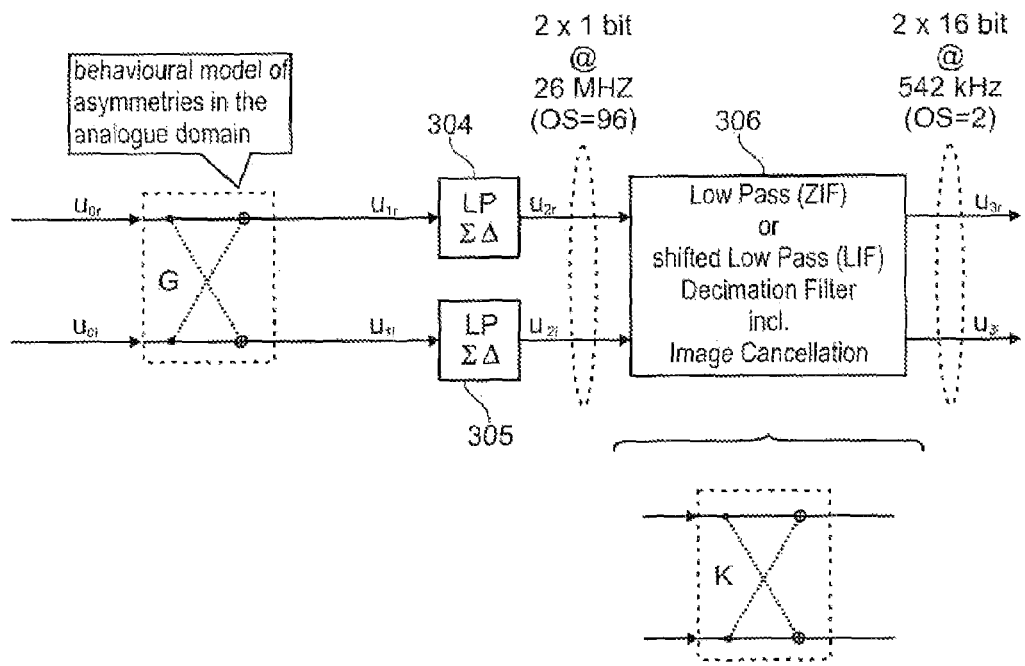
FIG. 3 schematically shows signal flow in a receiving chain including asymmetries in the analogues domain.

FIG. 3 illustrates equation (1) in form of a signal flow diagram. The problem in the digital domain is to reverse the effect of G. In this application this operation is denoted image cancellation (IC). FIG. 3 indicates a multiplication with a matrix K as one option. Here, K is essentially the inverse of G. In particular, FIG. 3 shows an ideal data signal having the components $u_{0r}$ and $u_{0i}$ which are distorted by the matrix G leading to the actual components $u_{1r}$ and $u_{1i}$ which are fed into Low Pass (LP) Sigma Delta Modulators (SDMs) 304 and 305 converting the analogue signals into two bit stream signals $u_{2r}$ and $u_{2i}$.

The decimation filter (DF) 306 turns the low resolution, highly oversampled input signal into a high resolution output signal with low oversampling factor. Furthermore, IC is implemented into the decimation filter by matrix multiplying the signals $u_{2r}$ and $u_{2i}$ by the matrix K described above.

In the following image cancellation (IC) is described in more detail. It should be noted that two classes of decimation filtering (DF) are to be distinguish in this context, namely:

single stage DF
double stage DF

Single stage DF may be employed in GSM Base Band Interface (BBI) chips, for example. The design may be a decimating FIR filter taking advantage of the 1 bit resolution of the input signal. Double stage DF may also be employed in GSM BBI chips. The first stage may be a Cascaded Integrator Comb (CIC) filter which may be implemented in form of cascaded accumulators, the decimation function and an FIR filter. The second stage may be a standard FIR decimation filter. An equivalent alternative to the described classical implementation of the first stage may be a decimating FIR filter.

IC may be done prior to DF, after DF or at an intermediate stage in case of multi stage DF. The respective arrangement has implications on the computational complexity of the IC functions itself in terms of word lengths and clock speed, and it also has implications on the computational complexity of the DF.

In the connection with FIGS. 4 to 7 the major arrangements in case of single and double stage DF are described.

Assuming single stage DF or double stage DF, the following options exist for placing the IC function:

case 1: IC prior to DF
case 2: single stage DF with post IC
case 3: double stage DF with post IC
case 4: double stage DF with intermediate IC.

The IC functions employ the 2-by-2 matrix K or the 2-by-4 matrix M.

The matrix multiply block in the following block diagrams visualizes the order of magnitude of the respective matrix elements in K and M: A solid branch indicates a weight of approximately 1.0 and a dotted branch indicates a weight of approximately 0. When symmetry in the analogue part of the receiver is perfect and IC is not required, the weights become exactly 1.0 and 0.

Figure 4:
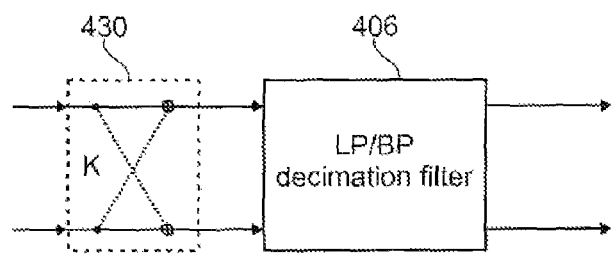
FIG. 4 schematically shows a first example for an image cancellation layout.

FIG. 4 depicts the case of IC prior to DF. This brute force approach corresponds to the implementation of a multiplication of the data signal by the matrix K 430, i.e. the image cancellation, before the decimation filter 406 which is a less preferred embodiment because of 2 reasons: First, the output of the IC block must be multi bit in order to keep the pass band clean of quantisation noise. This complicates the design of the DF which can not take advantage of a 1 bit input signal any more. Second, the IC function must be performed at high sampling rate.

Figure 5:
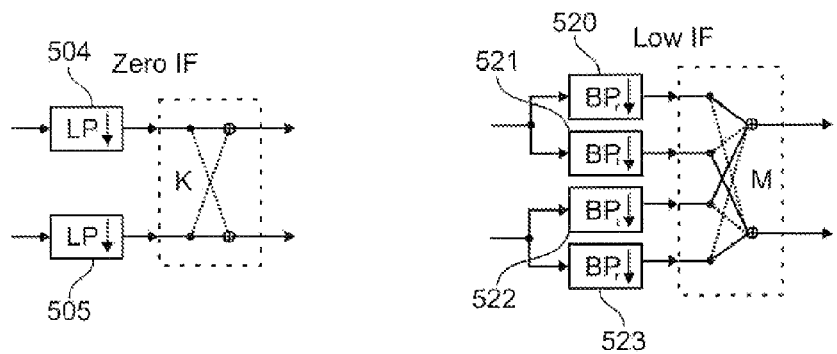
FIG. 5 schematically shows a second example for an image cancellation layout.

FIG. 5 depicts the case of a single stage DF with post IC. On the left side the straight forward approach in Zero IF mode is depicted: The 2-by-2 matrix multiply by matrix K is performed at the low rate of about 540 kHz after a low pass filtering by LPs 504 and 505 and the advantages of DF implementations for 1 bit input signals are preserved. Also, since the filtering is performed at the low sampling rate a lower computational load may be achievable than in the case of performing the IC before the decimation filtering.

In Low IF operation, preferably a 2-by-4 matrix multiply as shown in FIG. 5 on the right is used to preserve the advantages of the Zero IF implementation. That is, the data signal is multiplied by the matrix M after the DF filtering by the band pass (BP) filters 520, 521, 522, and 523.

Figure 6:
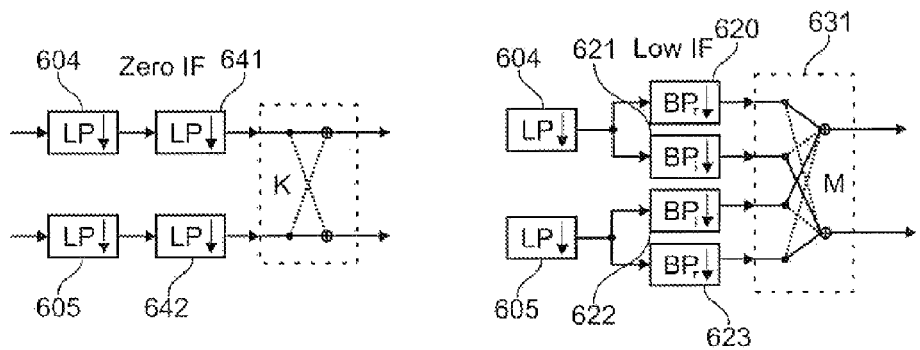
FIG. 6 schematically shows a third example for an image cancellation layout.

FIG. 6 depicts the case of a double stage DF with post IC. In particular, this case is similar to the case shown in FIG. 5. However, an additional stage of low pass (LP) filters is implemented. That is, in case of Zero IF each component of the complex signal is filtered by LP filters 604, 605 and 640, 641, respectively. On the right side of FIG. 6 the case of a Low IF is schematically shown. In particular, one LP filter 604, 605 is implemented before each pair of BP filters 620, 621, and 622, 623, respectively. The output signals of the BP filters are then subjected to the IC by matrix multiplying by using the matrix M 631. Again solid lines represent a weight of nearly 1.0 while dotted lines represent a weight of approximately 0.

Figure 7:
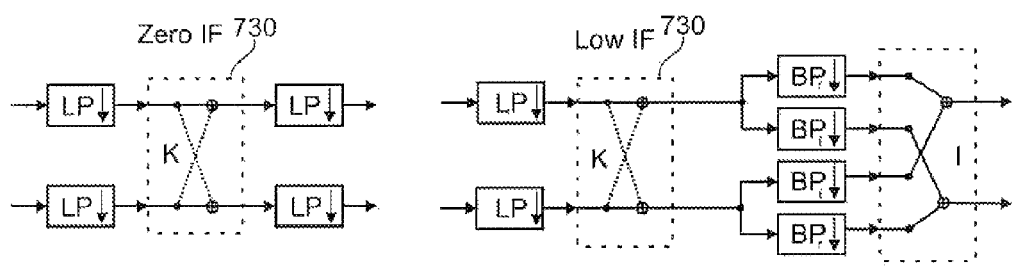
FIG. 7 schematically shows a fourth example for an image cancellation layout.

FIG. 7 depicts the case of a double stage DF with intermediate IC. Because the $1^{st}$ stage DF has low pass characteristic, regardless of the chosen IF, the same 2-by-2 matrix K 730 can be used in Zero IF and Low IF mode. The embodiments shown in FIG. 7 are similar to the one shown in FIG. 6, however the matrix multiply, i.e. the IC, is performed at another point. IC is now performed at a higher sampling rate than in case 3 of FIG. 6 and hence causes higher computational load. Also, the input word length to the $2^{nd}$ stage DF is increased compared to case 3 in FIG. 6 because the coefficients of the matrix K must be quantized with high resolution, leading to a growth in signal word length. Increased input word length to the $2^{nd}$ stage DF means increased computational complexity.

The image cancellation matrices K and M may be defined by:

$$K = \begin{bmatrix} 1 & 0 \\ k_{21} & k_{22} \end{bmatrix} \text{ and } M = \begin{bmatrix} 1 & -k_{21} & -k_{22} & 0 \\ k_{21} & 1 & 0 & k_{22} \end{bmatrix}$$

For example, $k_{21}$ is within the range $-2\epsilon \leq k_{21} \leq 2\epsilon$ and $k_{22}$ is within the range $1-2\epsilon \leq k_{22} \leq 1+2\epsilon$. In particular, $\epsilon$ may be given by $\epsilon = 10^{-r_{raw}/20dB}$, wherein $r_{raw}$ may correspond to a raw image rejection measured in dB, e.g. 20 dB. In that case the raw image rejection may correspond to an $\epsilon$ of 0.1.

Hardware (HW) implementations aim at short coefficient word lengths to keep multipliers small. This can be achieved for coefficients of the form $1+\kappa$ with $|\kappa|<<1$ by decomposing the product with the coefficient $1+\kappa$ into a sum of two products with the partial coefficients 1 and $\kappa$: The product by 1 is for free and the word length of the partial coefficient $1+\kappa$ can be reduced compared to the word length required for a coefficient $1+\kappa$ Since the matrix multiplication shall occur after decimation filtering at a moderate sampling rate of about 540 kHz, an implementation in SW is feasible as well.

Summarizing according to an exemplary aspect of the invention a method of image cancellation is provided wherein a decimation filtering together with a matrix multiply is used to perform the image cancellation. The position of the matrix multiply affects the computational load caused by the matrix multiply itself via the sampling rate at the respective position. The matrix multiply also affects the computational load caused by the subsequent DF (stage) by increasing the input word length to the subsequent DF. The preferred place of the matrix multiply is after DF, regardless of the number of filter stages. This way it may be possible to perform the matrix multiply at minimum clock rate and preserve efficient DF designs for low resolution input signals. In Low IF mode, a 2-by-4 matrix is used for IC and is connected properly to the 4 real valued band pass DFs forming the Low IF DF. This novel solution allows to preserve the known advantages of the Zero IF solution.

It should be noted that the term "comprising" does not exclude other elements or features and the "a" or "an" does not exclude a plurality. Also elements described in association with different embodiments or aspects may be combined.

It should also be noted that reference signs in the claims shall not be construed as limiting the scope of the claims.

The invention claimed is:

1. A method for data signal processing, the method comprising:
   filtering a pre-filtered quadrature data signal by using a 2×4 filtering matrix, and,
   wherein the filtering matrix is of the form of:

$$M = \begin{bmatrix} 1 & -k_{21} & -k_{22} & 0 \\ k_{21} & 1 & 0 & k_{22} \end{bmatrix}.$$

2. The method according to claim 1, further comprising:
   pre-filtering a quadrature data signal to generate the pre-filtered quadrature signal by using a decimation filter.

3. The method according to claim 2,
   wherein the decimation filter is a finite impulse response filter.

4. The method according to claim 2, further comprising:
   performing a low pass filtering of the quadrature data signal by a low pass filter before performing the decimation filtering.

5. The method according to claim 4,
   wherein the low pass filter comprises a low pass sigma delta modulator.

6. The method according to claim 1,
   wherein $k_{21}$ is given by $-2\epsilon \leq k_{21}$ $2\epsilon$ and $k_{22}$ is given by $1-2\epsilon \leq k_{22} \leq 1+2\epsilon$.

7. A non-transitory computer-readable storage medium, having a computer program which, when executed by a processor, performs the method according to claim 1.

8. A data signal processing device, comprising:
   an image cancellation filtering unit having inputs adapted to receive a pre-filtered quadrature data signal,
   wherein the image cancellation filtering unit is adapted to filter the pre-filtered quadrature data signal by using a 2×4 filtering matrix, wherein the filtering matrix is of the form of:

$$M = \begin{bmatrix} 1 & -k_{21} & -k_{22} & 0 \\ k_{21} & 1 & 0 & k_{22} \end{bmatrix}.$$

9. The data signal processing device according to claim 8, wherein the signal data processing device is a receiver.

10. The data signal processing device according to claim 8, wherein $k_{21}$ is given by $-2\epsilon \leq k_{21} \leq 2\epsilon$ and $k_{22}$ is given by $1-2\epsilon \leq k_{22} \leq 1+2\epsilon$.

* * * * *